United States Patent
Gurr et al.

(10) Patent No.: US 9,337,759 B2
(45) Date of Patent: May 10, 2016

(54) CIRCUIT FOR ACTIVATING AN ELECTRIC MOTOR IN A HAND GUIDED WORK APPARATUS

(71) Applicant: Andreas Stihl AG & Co. KG, Waiblingen (DE)

(72) Inventors: Kay-Steffen Gurr, Heilbronn (DE); Gernot Liebhard, Waiblingen (DE); Rene Wichert, Durlangen (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 140 days.

(21) Appl. No.: 13/970,217

(22) Filed: Aug. 19, 2013

(65) Prior Publication Data

US 2014/0049195 A1    Feb. 20, 2014

(30) Foreign Application Priority Data

Aug. 17, 2012    (EP) .................................... 12005943

(51) Int. Cl.
| | |
|---|---|
| *H02P 1/00* | (2006.01) |
| *H02P 6/20* | (2016.01) |
| *H02H 9/00* | (2006.01) |
| *H02P 1/10* | (2006.01) |
| *B60L 1/00* | (2006.01) |
| *B60L 11/18* | (2006.01) |

(52) U.S. Cl.
CPC . *H02P 6/20* (2013.01); *B60L 1/003* (2013.01); *B60L 11/1805* (2013.01); *H02H 9/001* (2013.01); *H02P 1/10* (2013.01); *B60L 2200/22* (2013.01); *B60L 2200/40* (2013.01); *B60L 2220/20* (2013.01); *B60L 2220/42* (2013.01); *Y02T 10/648* (2013.01); *Y02T 10/7005* (2013.01)

(58) Field of Classification Search
CPC .................................. A01G 3/06; B25F 5/008
USPC ........................................................ 318/139
See application file for complete search history.

(56) References Cited

U.S. PATENT DOCUMENTS

| | | | |
|---|---|---|---|
| 4,028,591 A | 6/1977 | Kahn et al. | |
| 4,191,917 A * | 3/1980 | Brown et al. | 320/111 |
| 6,511,200 B2 * | 1/2003 | Matsunaga | 362/119 |
| 6,650,091 B1 * | 11/2003 | Shiue et al. | 320/166 |
| 7,248,019 B2 * | 7/2007 | Ookubo et al. | 320/114 |

(Continued)

FOREIGN PATENT DOCUMENTS

| | | |
|---|---|---|
| DE | 100 29 583 A1 | 1/2002 |
| JP | 57-39079 A | 3/1982 |

OTHER PUBLICATIONS

Search Report of the European Patent Office dated Nov. 20, 2012 of European patent application EP12005943.1 on which this application is based.

*Primary Examiner* — Rina Duda
(74) *Attorney, Agent, or Firm* — Walter Ottesen, P.A.

(57) ABSTRACT

A circuit for activating an electric motor in a work apparatus includes a main circuit having an electric motor, a rechargeable-battery pack, and an operating switch for activating the motor, and also a parallel branch to the battery pack and the operating switch. A capacitor is arranged in the parallel branch. To lower the electrical contact load on the operating switch, provision is made to arrange an electronic switch, which is connected in series with the capacitor, in the parallel branch. The series circuit which includes the capacitor and the electronic switch has a first and a second end. The ends form the only electrical power connection of the capacitor to the main circuit. The electronic switch in the series circuit will apply a supply voltage, which is provided by the battery pack, to the capacitor only after a period of time following closing of the operating switch has elapsed.

15 Claims, 4 Drawing Sheets

(56) References Cited

U.S. PATENT DOCUMENTS 7,753,135 B2 * 7/2010 Lennartz ................. 173/109
2006/0092674 A1 5/2006 Belton et al.
2007/0164706 A1 7/2007 Wei
2010/0163266 A1 7/2010 Matsunaga et al.

* cited by examiner

CIRCUIT FOR ACTIVATING AN ELECTRIC MOTOR IN A HAND GUIDED WORK APPARATUS

CROSS REFERENCE TO RELATED APPLICATION

This application claims priority of European patent application no. 12005943.1, filed Aug. 17, 2012, the entire content of which is incorporated herein by reference.

BACKGROUND OF THE INVENTION

Circuits for activating electric motors in manually controlled work apparatuses are generally known and essentially include a main circuit having the electric motor, a rechargeable-battery pack as the energy source, and an operating switch for activating an electric motor. In order to cover a brief increase in the current requirement by the electric motor, it is known to arrange a capacitor in parallel with the electric motor and in parallel with the rechargeable-battery pack and the operating switch, the capacitor providing a portion of the motor current in special operating situations.

If a rechargeable battery-operated work apparatus is put into operation from the inoperative state after a relatively long break in operation, closing the operating switch wakes up the control electronics and at the same time charges the capacitor which is situated in the parallel branch. A considerable electrical switching load is placed on the operating switch because of the high charging current of the capacitor. In the case of a mechanical operating switch, the contacts are subject to increased wear in the process on account of the impact of contact.

SUMMARY OF THE INVENTION

It is an object of the invention to provide an electrical circuit for activating an electric motor configured such that the electrical switching load on the operating switch when the work apparatus is switched on is reduced.

A circuit arrangement of the invention is for starting an electric motor of a hand guided work apparatus. The circuit arrangement includes: an electric motor; a battery pack configured as an energy source; a mechanical operating switch configured to start the electric motor and the mechanical operating switch having an open switch position and a closed switch position; a main circuit which includes the electric motor, the battery pack and the mechanical operating switch; a capacitor; an electronic switch; a parallel circuit branch arranged in parallel to the battery pack and the operating switch; the parallel circuit branch including the capacitor and the electronic switch connected in series with each other and having first and second ends; the parallel circuit branch being configured such that the first end and the second end are the only electrical power connections of the capacitor to the main circuit; and, the electronic switch being configured to apply a supply voltage provided by the battery pack to the capacitor upon elapse of a predetermined time duration after the mechanical operating switch is switched to the closed switch position.

An electronic switch is incorporated in the parallel branch in series with the capacitor. This series circuit, which includes the capacitor and the electronic switch, has a first end and a second end. These ends are connected to the main circuit, with the result that the charging and discharging current of the capacitor flows exclusively via the ends of the series circuit. The electrical power connection of the capacitor to the main circuit is therefore exclusively formed by the two ends of the series circuit.

According to a feature of the invention, the switch which is situated in the series circuit of the parallel branch is activated by a drive circuit only after a period of time following closing of the operating switch in the main circuit has elapsed, in order to apply a supply voltage, which is provided by the rechargeable-battery pack, to the capacitor. In this case, the electronic switch in the series circuit, which electronic switch is connected in series with the capacitor, can be operated as an on/off switch or else can be slowly switched on over a period of time, in order to avoid a sudden current loading on the components.

The electrical switching load on the operating switch at the instant at which it is switched on is significantly lowered by the circuit according to the invention, with the result that switching cycles of more than 50,000 switching processes are possible without destruction. In this case, the period of time until the electronic switch of the series circuit is connected is advantageously selected such that the impact of contact which is characteristic in a mechanical switch slows down, that is, the contacts bear against one another in a gentle manner.

In a preferred embodiment, the electronic switch is situated in the ground branch of the capacitor, that is, the electronic switch is situated in the electrical connection between the ground connection of the capacitor and the ground of the circuit; it can be practical to provide the electronic switch on the high-side of the capacitor, that is, in the electrical connection of the positive pole of the capacitor to the positive pole of the rechargeable-battery pack.

The capacitor is preferably an electrolytic capacitor; it is likewise practical to configure the capacitor as a double-layer capacitor, a film capacitor or the like.

The capacitor has a capacitance of more than 10 µF, in particular the capacitor has a capacitance of between 100 µF and 5000 µF. A disproportionately high switching load on the operating switch is avoided even in the case of very high capacitances of up to 5000 µF by the configuration of the circuit according to the invention.

The operating switch is preferably a mechanical on/off switch, the mechanical switch can expediently also be in the form of a proportional switch with a characteristic curve between the off-position and the full-load position.

The electronic switch of the series circuit is, in particular, a power transistor, preferably a MOSFET, a bipolar transistor or a corresponding power switch. In order to further lower the current loading on the operating switch during the switch-on operation and the electrical loading on other components, provision is made to not suddenly connect the electronic switch of the series circuit after the period of time has elapsed, but rather to move the electronic switch from the blocking position to the fully connected position over a predetermined control time in a controlled manner The supply voltage which is applied to the capacitor is expediently the rechargeable-battery voltage; it may be advantageous to configure the supply voltage to be smaller than the rechargeable-battery voltage via a voltage divider or the like.

If the mechanical operating switch remains switched on, provision is made for the electronic switch of the series circuit to disconnect the capacitor from the supply voltage after an electrical operating state was identified and a period of time has elapsed. Therefore, the drive circuit can establish, for example by means of its voltage supply, whether the rechargeable-battery voltage falls below a critical limit value;

if this state occurs, it is identified and, after a period of time has elapsed, the capacitor of the series circuit is disconnected from the supply voltage, with the result that no leakage current can flow, for example, by means of the capacitor. As a result, the use of cost-effective capacitors with high leakage currents is possible, the use of these capacitors would otherwise be impractical.

In a preferred embodiment, the circuit according to the invention is provided in a mechanically commutated direct-current motor, that is to say in a DC motor; it can also be practical to provide the circuit in conjunction with an electronically commutated electric motor.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
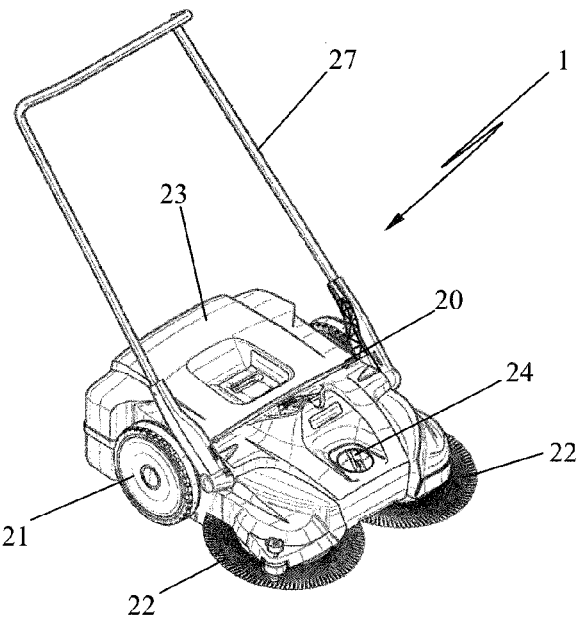
FIG. 1 is a perspective view of a manually operated work apparatus using the example of a sweeping apparatus.
Figure 2:
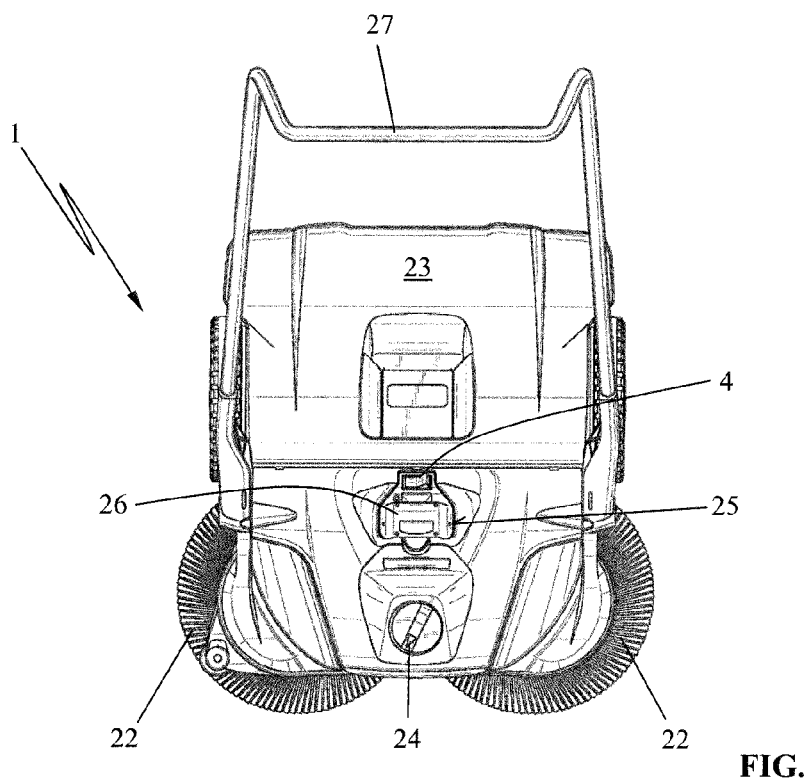
FIG. 2 is a plan view of the sweeping apparatus according to FIG. 1.

The work apparatus 1 illustrated in FIGS. 1 and 2 is a sweeping apparatus 20 which stands on the ground by means of wheels 21 and, as work tools, has cleaning brushes 22 in the front region. The cleaning brushes rotate about vertical axes. The rotating cleaning brushes 22 deliver captured dirt to a rear collection container 23.

In the front housing region, a rotary knob 24 for adjusting the height of the work apparatus 1 is provided between the cleaning brushes; a rechargeable-battery compartment 25, into which a rechargeable-battery block 26 can be inserted, is formed in the housing between the rotary knob and the collection container 23. An operating switch 4, which is in the form of a mechanical switch 10 (FIGS. 3 and 7), is provided in the housing between the rechargeable-battery compartment 25 and the collection container 23.

The sweeping apparatus 20 also has a bale handle 27 for guiding the work apparatus 1. The bale handle is of U-shaped design and is attached to the housing of the sweeping apparatus by way of its leg ends.

Figure 3:
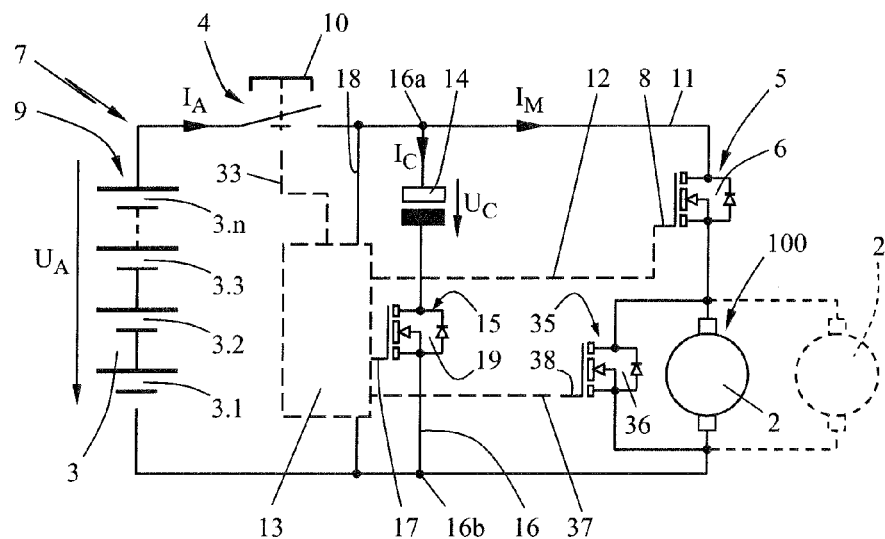
FIG. 3 shows a basic circuit diagram of an electric motor in the form of a drive motor in a hand guided work apparatus.

The electric motor, which is used as a drive motor, of the work apparatus 1 is put into operation via the mechanical switch 10. The electric motor 2 shown in FIG. 3 is a direct-current motor 100. The electric motor 2 is situated in the main circuit 11 of a circuit 7 for activating the electric motor 2. The main circuit 11 essentially includes the electric motor 2, a rechargeable-battery pack 3 as the energy source 9, and, the operating switch 4 which is configured as a mechanical switch 10 which can be manually operated, in particular as a mechanical on/off switch.

If a plurality of electric motors are provided for driving the cleaning brushes 22, for example one electric motor for each cleaning brush 22, the electric motors are connected electrically in parallel to one another, as illustrated by dashed lines in FIG. 3. The circuit 7 according to the invention itself remains unchanged.

The rechargeable-battery pack 3 is formed from individual cells 3.1, 3.2, 3.3 to 3.$n$, wherein the individual cells can be connected in series and/or in parallel.

In the embodiment shown, an electronic power switch 5, which is in the form of a MOSFET 6 in the embodiment shown, is also provided in the main circuit 11 on the high-side of the electric motor 2, that is, on the side of the positive pole. The control connection or the gate 8 is connected to a drive circuit 13 via a control line 12. It can be practical to provide the electronic power switch 5 on the low-side of the electric motor 2, that is, on the side of the ground connection, instead of on the high-side of the electric motor 2.

Furthermore, an electronic power switch 35, which is advantageously in the form of a MOSFET 36, is connected in parallel with the electric motor 2. The power switch 35 is connected in parallel with the electric motor 2 and serves as a free-wheeling path when switching inductive loads; the slow-down time of the motor 2 can also advantageously be lowered via the free-wheeling path when the operating switch 4 is open. The gate 38 is connected to the drive circuit 13 via the control line 37.

The circuit 7 further includes a series circuit which includes a capacitor 14 and an electronic switch 15, wherein the series circuit 16 is connected in the main circuit 11 as a parallel branch to the power switch 5 and the electric motor 2. The electronic switch 15 is advantageously provided in the ground branch of the capacitor 14, that is, is connected in the electrical connection between the negative pole of the capacitor 14 and the ground connection of the circuit 7 or the negative pole of the rechargeable-battery pack 3.

The series circuit 16 has a first end 16$a$ and a second end 16$b$. These ends 16$a$ and 16$b$ represent the only direct electrical power connection of the capacitor 14 to the main circuit 11.

The control connection (gate 17) of the electronic switch 15, which is preferably in the form of a MOSFET 19, is connected to the drive circuit 13; this indirect connection to the main circuit 11 is not a power connection since no significant charging or discharging current of the capacitor 14 flows across the control connection 17. The electrical charging and discharging current of the capacitor 14 flows across the ends 16$a$ and 16$b$ of the series circuit, with the result that the ends (16$a$, 16$b$) represent the only electrical power connection of the capacitor 14 to the main circuit 11. The drive circuit 13 expediently also controls further electronic power switches (5, 35) of the circuit 7.

The drive circuit 13 detects the process of the mechanical operating switch 4 being switched on, for example via its own voltage supply 18 or a signal line 33 by means of which the drive circuit 13 is informed of the switching position of the operating switch 4.

Figure 8:
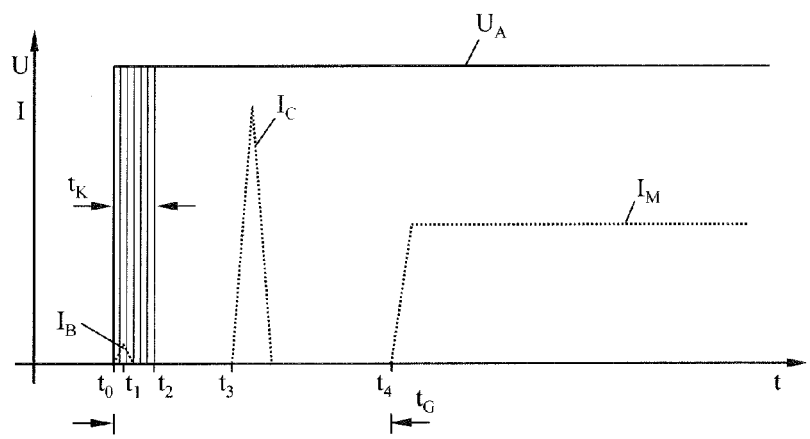

If the user manually switches on the main circuit 11 of the circuit 7 via the mechanical operating switch 4 at instant $t_0$ (FIG. 8), the control electronics are first awakened, that is, the drive circuit 13 is put into operation. In this case, a low operating current $I_B$ occurs over time $t_1$, as shown in FIG. 8. This low operating current $I_B$ is switched by the operating switch 4, in particular the operating switch applies only this low operating current $I_B$ during the time period $t_K=t_2-t_0$ of the impact of contact of the mechanical switch 10. Impact of contact occurs in each mechanical switch 10 and designates the time period of the switchover operation from the off-state to the on-state in which the contacts of the operating switch 4 or the mechanical switch 10 bear against one another in a gentle manner.

After a predefined period of time $t_3-t_0$ has elapsed, it being possible for this period of time to lie in a range of from 1 to 300 milliseconds, preferably in the range of from 1 to 50 ms, the drive circuit 13 actuates the electronic switch 15 in the series circuit 16, the gate 17 of the MOSFET 19 in the embodiment shown, at time point $t_3$ (FIG. 8), with the result that the switch 15 is fully or partially connected and therefore a current $I_C$ flows in the series circuit 16 as the parallel branch to the rechargeable-battery pack 3 and the operating switch 4; the capacitor 14 is charged to the voltage $U_C$. A supply voltage, which is preferably the rechargeable-battery voltage $U_A$, is applied to the capacitor 14.

Since the MOSFET 19 closes after actuation of the operating switch 4 with a time delay of a period of time of approximately 1 ms to 50 ms, advantageously approximately 10 ms, the impact of contact is preferably substantially or else completely slowed down and the charging current $I_C$ of the capacitor 14 cannot subject the operating switch 4 to loading at the instant at which it is switched on and during the impact of contact. If the electric motor 2 is put into operation—preferably by means of a power switch 5—at $t_4$ for example, the charging current $I_C$ of the capacitor 14 will have already fallen. The charging current $I_C$ through the capacitor 14 advantageously does not lead to an increased electrical load on the rechargeable-battery pack 3 in addition to the motor current $I_M$. The current $I_A$ drawn from the rechargeable-battery pack 3 would therefore be substantially the motor current $I_M$ in a time after the instant $t_4$ after the operating switch 4 is switched on. The electronic switch 5 which is connected by the drive circuit 13, that is, the MOSFET 6, is actuated by means of the gate 8 and closes the main circuit 11; the motor current $I_M$ flows through the direct-current motor 100; the electric motor 2 rotates and drives the work tool of the work apparatus 1.

The drive circuit 13 according to FIG. 3, which includes a direct-current motor 100 as the drive motor for a work tool, can be used in a large number of rechargeable battery-operated work apparatuses 1, as illustrated by way of example in FIGS. 1, 2 and 4 to 6.

Figure 4:
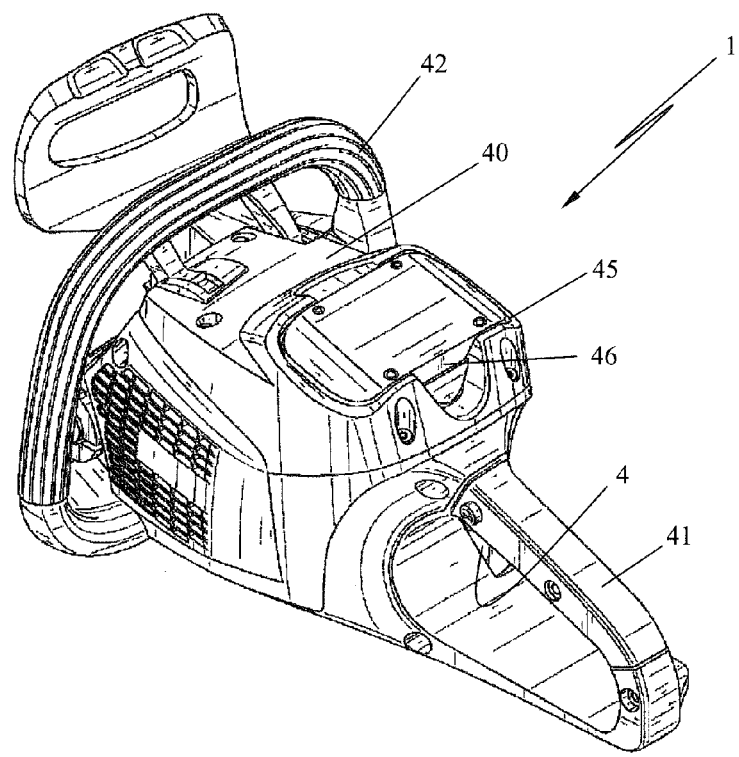
FIG. 4 is a schematic perspective view of an electric chain-saw.

FIG. 4 shows, as work apparatus 1, a power saw 40, a rechargeable-battery compartment 45 being formed in the housing of said power saw. A rechargeable-battery block 46 is inserted into the rechargeable-battery compartment 45, the battery block being formed from individual cells 3.1 to 3.$n$, which are arranged in a rechargeable-battery housing, as the rechargeable-battery pack 3.

The power saw 40 has a rear handle 41, which is oriented in the longitudinal direction of the work apparatus 1, and a bale handle 42, which is arranged in the front region of the housing and is situated transverse to the longitudinal direction, as a front handle. The rechargeable-battery compartment 45 is situated between the bale handle 42 and the rear handle 41, wherein the operating switch 4 for the electric motor 2, which is provided in the housing as the drive motor, is provided in the rear handle 41. The operating switch 4 is not provided in the form of an on/off switch, but rather as an actuation-proportional throttle which outputs a signal to the drive circuit 13 as a function of the executed actuation path. The rotation speed of the electric motor 2 (FIG. 3) is controlled as a function of the actuation path.

Figure 5:
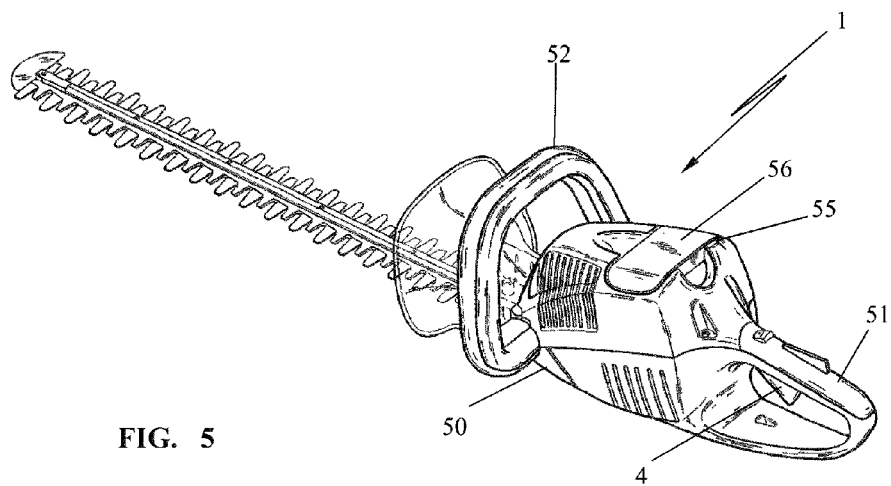
FIG. 5 is a perspective view of an electric hedge trimmer.

The work apparatus 1 illustrated in FIG. 5 is a hedge trimmer 50 having a rear handle 51, which is oriented in the longitudinal direction of the work apparatus 1, wherein a bale handle 52, which is situated transverse to the longitudinal direction, is arranged in the front region of the housing as a front handle. The front bale handle 52 is in the form of a two-shell handle, wherein the two shell elements can be moved relative to one another and operate, for example, a switch of a two-handed safety device.

A rechargeable-battery compartment 55 is formed in the housing of the hedge trimmer 50 between the front bale handle 52 and the rear handle 51, a rechargeable-battery block 56 being inserted into said rechargeable-battery compartment as the energy source.

The operating switch 4 is arranged in the rear handle 51 of the hedge trimmer. The operating switch is configured as an on/off switch.

Figure 6:
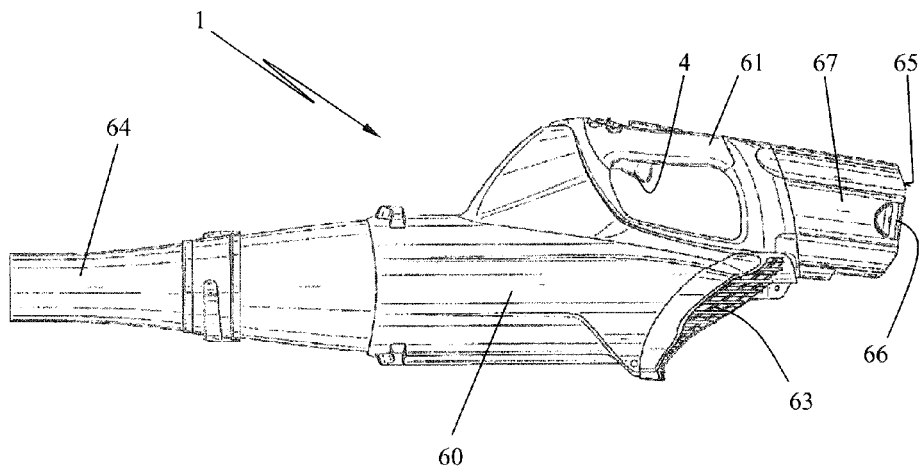
FIG. 6 is a side view of an electric blower.

A further work apparatus 1 is shown in FIG. 6 and is in the form of a blower 60. The housing of the blower 60 has a handle 61 which is oriented in the longitudinal direction of the work apparatus 1 and is configured as an upper handle in the embodiment shown. An intake opening 63 is provided in the housing, the intake opening being situated beneath the handle 61; the blowing-air stream which is generated by a fan is emitted forward by a blower pipe 64.

A housing attachment 67 is provided at the rear end of the handle 61, the housing attachment extending in the longitudinal direction of the work apparatus 1 and forming a rechargeable-battery compartment 65. A rechargeable-battery block 66 is inserted into the rechargeable-battery compartment as the energy source.

The illustrated rechargeable battery-operated work apparatuses 1 show examples of electric work apparatuses in which the circuit according to the invention can be advantageously used. Practical work apparatuses also include rechargeable battery-operated cut-off machines, rechargeable battery-operated backpack blowers, brushcutters, harvesting apparatuses or the like.

Figure 7:
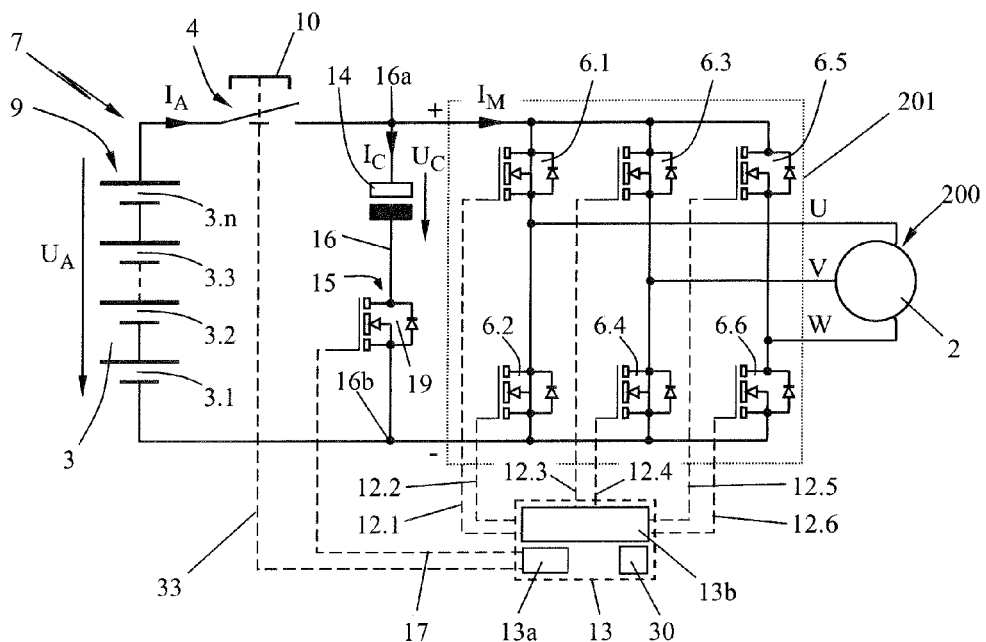
FIG. 7 is a circuit diagram for operating an electronically commutated motor in the form of a drive motor in a work apparatus; and, FIG. 8 shows a schematic graph of the time profile of the operating voltage U and the operating current $I_A$ across the operating switch.

The embodiment according to FIG. 7 schematically shows the circuit according to the invention from FIG. 3 for a design of the electric motor 2 as an electronically commutated motor 200 (EC motor). Identical components, circuits and signal lines are denoted by the same reference symbols as in FIG. 3.

The electronically commutated electric motor 200 is actuated via a drive bridge 201, wherein the drive bridge converts a rechargeable-battery voltage $U_A$ into the three phases U, V and W for the EC motor 200. To this end, three parallel branches are provided in the drive circuit wherein two MOSFETs (6.1, 6.2; 6.3, 6.4; 6.5, 6.6) are arranged in corresponding ones of the parallel branches. The phase connections U, V and W are tapped off between each two MOSFETs of a parallel branch; the phase U is tapped off between the MOSFETs 6.1 and 6.2, the phase V is tapped off between the MOSFETs 6.3 and 6.4, and the phase W is tapped off between the MOSFETs 6.5 and 6.6.

The control connections (gate) of the MOSFETs are actuated via control lines 12.1 to 12.6 by the drive circuit 13, which also actuates the MOSFET 19 of the series circuit 16 which includes capacitor 14 and MOSFET 19, via the control line 17. The drive circuit 13 is furthermore informed of the operating state of the operating switch 4 via the signal line 33.

In order to actuate the electronic switch 15 in the series circuit 16, it may be practical to provide a control circuit 13$a$, which is separate from the drive circuit 13, and to design the bridge controller 13$b$ separately from said control circuit. Provision is advantageously made to control the control circuit 13$a$ and the bridge controller 13$b$ using a microprocessor 30, wherein the circuits and the microprocessor 30 are advantageously jointly combined in the drive circuit 13.

The capacitor 14 of the series circuit 16 can be a single capacitor of any desired design (FIGS. 3, 7), for example a double-layer capacitor, a film capacitor, an electrolytic capacitor or the like. The invention is preferably designed with an electrolytic capacitor. The capacitors provided can also be series circuits or parallel circuits of components of identical or different capacitances.

The capacitor 14 used has a capacitance of more than 10 μF, in particular the capacitance of the capacitor 14 is in the range of from 100 μF to 5000 μF.

In the shown embodiment, the electronic switch 15 of the series circuit 16 is a power transistor. The power transistor is preferably not suddenly switched from the off-position to the fully on position, but rather is turned on within a prespecified control time, with the result that the charging current increases in a controlled manner. As a result, the peak current load on the components of the circuit and also the electrical load on the rechargeable-battery pack 3 can be lowered.

In practice—for example in the sweeping apparatus according to FIGS. 1 and 2—the mechanical operating switch 4 can remain in its on-position since the user uses the sweeping apparatus until the drive circuit 13 switches off the electric motor on account of the rechargeable-battery voltage having dropped. If this state occurs, this operating state is identified—for example by the voltage dropping below a rechargeable-battery limit voltage—and the capacitor of the series circuit is disconnected from the supply voltage after this state was identified and a prespecified period of time has elapsed, so that the design-dependent leakage current through the capacitor does not lead to deep-discharge of, and possible damage to, the rechargeable-battery pack.

The rechargeable-battery pack 3 which includes individual cells 3.1, 3.2, 3.3 to 3.$n$ is preferably a lithium-ion rechargeable-battery pack; other configurations which are chemically based on lithium, for example lithium-polymer, lithium-iron or the like are also practical. In the rechargeable-battery pack 3, individual cells 3.1 to 3.$n$ of any desired number, design and any desired chemical structure can be connected to one another to form an energy source 9.

The graph according to FIG. 8 shows, as an embodiment, a time sequence for switching on a work apparatus. The operating switch 4, preferably a mechanical on/off switch 10, is switched on at time point $t_0$, as a result of which the rechargeable-battery voltage $U_A$ is applied to the circuit 11 and the drive circuit 13. A first operating current $I_B$ is produced, this operating current being received by the drive circuit 13. The operating current $I_B$ is switched as switching current from the operating switch 4 and is also applied during the period of time $t_k$ of the impact of contact. After the impact of contact of the operating switch 4 has slowed down, the series circuit 16 is connected at time point $t_3$, which takes place approximately 1 ms to 50 ms after switch-on time point $t_0$, with the result that the capacitor 14 is charged and a charging current $I_C$ flows. After the capacitor 14 is charged—the charging current $I_C$ has preferably subsided—the electric motor 2 is switched on at time point $t_4$, with the result that the motor current $I_M$ flows. Time point t4 is in a range of from approximately 1 ms to 300 ms after time point $t_0$, the instant at which the manual operating switch 4 is switched on. The period of time $t_G$ between the time point $t_0$ at which the manual operating switch 4 is switched on and the process of switching on the motor current $I_M$ at time point $t_4$ is from 1 ms to 300 ms.

It is understood that the foregoing description is that of the preferred embodiments of the invention and that various changes and modifications may be made thereto without departing from the spirit and scope of the invention as defined in the appended claims.

What is claimed is:

1. A circuit arrangement for starting an electric motor of a hand guided work apparatus, the circuit arrangement comprising:
   an electric motor;
   a battery pack configured as an energy source;
   a mechanical operating switch configured to start said electric motor and said mechanical operating switch having an open switch position and a closed switch position;
   a main circuit which includes said electric motor, said battery pack and said mechanical operating switch;
   a capacitor;
   said main circuit being configured to electrically connect said electric motor to said battery pack when said mechanical operating switch is in said closed position causing said electric motor to be supplied from said battery pack during operation thereof;
   an electronic switch;
   a parallel circuit branch arranged in parallel to said battery pack and said operating switch;
   said parallel circuit branch including said capacitor and said electronic switch connected in series with each other to define a series circuit and said series circuit having first and second ends;
   said parallel circuit defining a current path parallel to said battery pack and said mechanical operating switch and being configured so as to cause the voltage of said battery pack to be applied across said series circuit when said mechanical operating switch is switched into said closed switch position;
   said series circuit being configured such that said first end and said second end are the only electrical power connections of said capacitor to said main circuit causing the charge and discharge currents of said capacitor to flow exclusively via said first and second ends of said series circuit;
   said electronic switch being configured to cause a supply voltage provided by said battery pack to be applied across said capacitor when said mechanical operating switch is switched to said closed switch position;
   for starting said electric motor, said mechanical operating switch is first switched into said closed switch position while said electronic switch is open; and,
   to reduce the current load of said mechanical operating switch when switching into said first switch position thereof, said electronic switch of said series circuit is closed only after an elapse of a time duration after the closing of said mechanical operating switch.

2. The circuit arrangement of claim 1, wherein:
   said capacitor has a ground branch connected to ground; and,
   said electronic switch is arranged in said ground branch.

3. The circuit arrangement of claim 1, wherein said capacitor is an electrolytic capacitor.

4. The circuit arrangement of claim 1, wherein said capacitor has a capacitance greater than 10 μF.

5. The circuit arrangement of claim 4, wherein said capacitor has a capacitance lying in the range of 100 μF to 5,000 μF.

6. The circuit arrangement of claim 1, wherein said operating switch is a mechanical on/off switch.

7. The circuit arrangement of claim 1, wherein said electronic switch is a power transistor.

8. The circuit arrangement of claim 7, wherein said power transistor is a MOSFET.

9. The circuit arrangement of claim 1, wherein said electronic switch has a blocking position and a conducting position and is configured to be switched from said blocking position to said conducting position in a predetermined control time.

10. The circuit arrangement of claim 1, wherein:
   said battery pack has battery voltage $U_A$; and,
   said supply voltage is said battery voltage $U_A$.

11. The circuit arrangement of claim 1, wherein said electronic switch is configured to detect an electrical operating state and to disconnect said capacitor from said supply voltage after detection of the electrical operating state and upon elapse of a predetermined time duration.

12. The circuit arrangement of claim 1, wherein said electric motor is an electronically commutated electric motor.

13. The circuit arrangement of claim 1 further comprising:
   at least one further electric motor;
   each of said electric motors being mechanically commutated electric motors and being arranged electrically in parallel in said main circuit.

14. The circuit arrangement of claim 1, wherein said electric motor is a DC motor.

15. The circuit arrangement of claim 1, wherein said main circuit includes a power switch and said main circuit is configured for starting said electric motor via said power switch when said charge current ($I_C$) of said capacitor has decayed.

\* \* \* \* \*